June 29, 1926.
A. S. FETTERMAN
BELT FASTENER
Filed Oct. 20, 1924
1,590,433
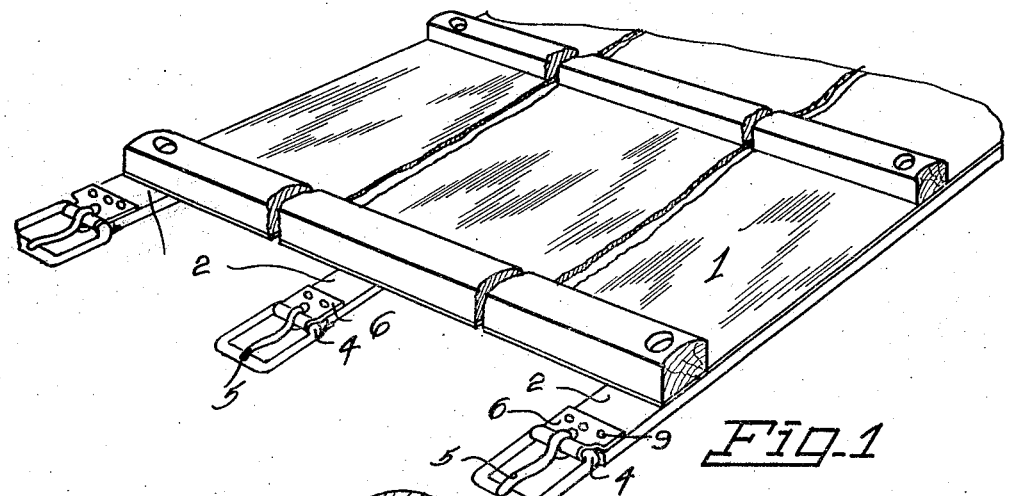
Fig.1
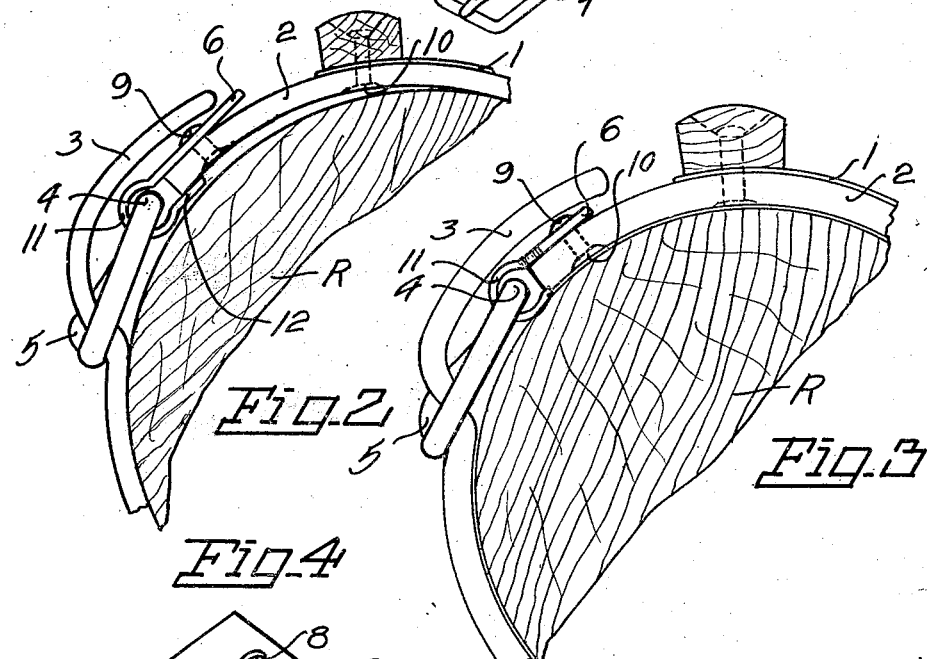
Fig.2  Fig.3
Fig.4
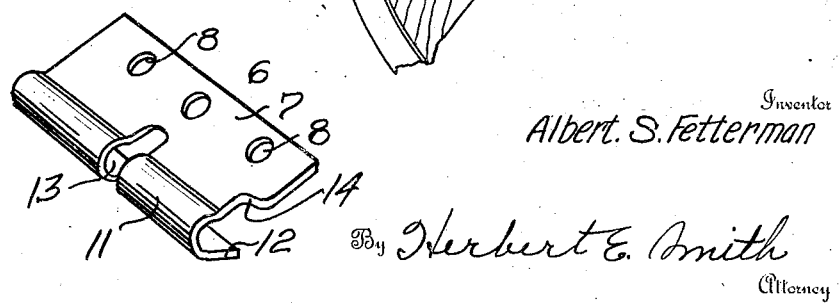
Inventor
Albert. S. Fetterman
By Herbert E. Smith
Attorney Patented June 29, 1926.

1,590,433

UNITED STATES PATENT OFFICE.

ALBERT S. FETTERMAN, OF DISHMAN, WASHINGTON, ASSIGNOR TO SPOKANE DRAPER COMPANY, OF DISHMAN, WASHINGTON.

BELT FASTENER.

Application filed October 20, 1924. Serial No. 744,628.

My present invention relates to improvements in belt fasteners of the detachable type involving a hinged buckle and its anchoring clip. On harvesting machines and some of the feeder mechanisms for threshing machines now in use, rolls or rollers of comparatively small diameter are generally employed for guiding and supporting the draper belts. The wear on the belts as they pass around these rolls is found to be excessive, resulting in frequent breaking of the belts at the fastening joint, with consequent expense for repairs and loss of time, while repairs are being made, in the operation of the machinery. I have found that a major factor in the breaking of the belts at the fastening joint is primarily due to the construction of the buckle and its means of attachment to the belt end. The purpose of my invention is the provision of an anchoring clip for the belt buckle which is so constructed and combined with the belt end as to eliminate the causes for breaking of the belt and thus enhance the durability of the belt and reduce to this extent the cost of maintenance of the machine with which the belt is employed.

I accomplish this purpose by the novel features of construction and combinations and arrangements of parts in a belt fastener as will hereinafter be more fully set forth and claimed.

In the accompanying drawings I have illustrated one complete example of the physical embodiment of my invention wherein the parts are combined and arranged in accordance with the principles of my invention.

Figure 1 is a perspective view of a portion of a draper belt showing the use of three belt fasteners of my invention.

Figure 2 is an enlarged view showing in transverse section a portion of a draper roll with ends of the belt passing around the roll and illustrating the belt fastener in use.

Figure 3 is a view similar to Figure 2 with a slightly modified construction of fastener.

Figure 4 is a perspective view of one of the anchoring clips for the buckle, before being affixed to the belt end.

For a clear understanding of the purpose of my invention and to illustrate the relation and general assembly of parts I have shown in Figure 1 a portion of a draper belt as 1 which has on its inner or wear side the usual longitudinally extending straps 2, and in Figures 2 and 3 the free ends 3 of these or complementary straps are shown. The buckle illustrated may be of standard type comprising a rectangular frame with an attaching bar 4 and the usual pivoted tongue 5.

The anchoring clip for fastening the buckle at the end of the strap 2 is preferably fashioned in a suitable machine as by stamping, and is indicated as a whole in Figure 1 by the numeral 6. This anchoring clip is stamped to form as illustrated in Figure 4 with an attaching plate 7 preferably of width corresponding to the width of the strap 2 and the plate is perforated or punched with rivet holes as 8 to receive the rivets 9. The fastening rivets are passed from the outer side of the strap through the plate and through the strap, and the flat head 10 of the rivet is fashioned at the inner or wear side of the belt flush with the inner face of the strap end 2.

The anchoring clip is provided with a retaining hook which is formed with a rounded bend 11 forming a bearing for the attaching bar 4 of the buckle and in which said bar is free to turn, and a narrow under edge or flange 12 forming the extremity of the hook extends the full width of the anchoring clip. A central slot 13 is provided in the anchoring clip to accommodate the tongue 5 of the buckle, and an offset or bend 14 is provided between the plate and the hook to facilitate attachment in proper position of the clip to the strap of the belt.

It will be noted in Figures 2 and 3 that the edge or flange 12 of the anchoring clip terminates intermediate of the row of rivets and the hook 11 of the clip and that the rivets consequently pass through only the attaching plate and the end of the strap 2. In Figures 2 and 3 the terminal point or extremity of the flange 12 is located at different places, but both are intermediate of the attaching rivets and the hook or pivotal bearing for the buckle. In both instances however the possibility of wear on the strap as the fastening device passes around the roller R is eliminated. That is, the strap back of the attaching rivets is not subjected to wear from a metal part of the fastener and consequently the strap cannot be weakened by frictional engagement of the clip therewith at the wear side of the strap. Should wear on the strap end occur between the buckle and the rivets such wear will not impair the durability of the belt.

The offset formation or cut out 14 at the outer end of the anchoring clip best shown in Figure 4, and also indicated at the left in Figure 1 permits an alinement of the outer edge of the strap with one of the longitudinal side bars of the buckle, to eliminate a projecting or abutting part from the side of the strap. The extremity of the flange 12 may be partly embedded in the extremity of the strap as in Figure 3 or this extremity of the flange may project slightly back of the extremity of the strap as in Figure 2, with substantially the same results. In both instances a fastening is provided which will pass freely around the roller or roll R without causing undue or excessive wear on the draper strap.

As thus constructed the belt fastenings of my invention have been and are now in successful use as above described and herein illustrated and are accomplishing the results set forth as the purpose of my invention.

Having thus fully set forth my invention, what I claim as new and desire to secure by Letters Patent is—

The combination in a belt fastener with a buckle, and a free strap end, of an attaching plate engaging the outer face of the other strap end and attaching rivets passed through said plate and strap end, a buckle retaining hook on the plate and projecting over the latter strap end and a cut out portion in said hook for the buckle, and a flange on said hook engaging the wear side of the strap end and terminating intermediate the hook and rivets.

In testimony whereof I affix my signature.

ALBERT S. FETTERMAN.